United States Patent
Sheu

(10) Patent No.: US 8,824,844 B2
(45) Date of Patent: Sep. 2, 2014

(54) OPTICAL TRANSMISSION SYSTEM CAPABLE OF TRANSMITTING OPTICAL SIGNALS ACCORDING TO ADDRESS INFORMATION

(75) Inventor: Yi-Zhong Sheu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 63 days.

(21) Appl. No.: 13/598,635

(22) Filed: Aug. 30, 2012

(65) Prior Publication Data

US 2013/0287341 A1 Oct. 31, 2013

(30) Foreign Application Priority Data

Apr. 26, 2012 (TW) ............................. 101114817 A

(51) Int. Cl.
*G02B 6/00* (2006.01)
*G02B 6/36* (2006.01)

(52) U.S. Cl.
USPC .......................................... 385/50; 385/147

(58) Field of Classification Search
CPC ....................................................... G06B 6/00
USPC .............. 385/14, 50–58, 88–90, 147
See application file for complete search history.

(56) References Cited

U.S. PATENT DOCUMENTS

| | | | | |
|---|---|---|---|---|
| 4,281,416 | A | * | 7/1981 | Seki et al. ...................... 398/178 |
| 5,091,991 | A | * | 2/1992 | Briggs et al. ..................... 385/82 |
| 5,610,749 | A | | 3/1997 | Mizoguchi et al. |
| 5,812,289 | A | * | 9/1998 | Tomooka et al. ............... 398/92 |
| 6,094,293 | A | | 7/2000 | Yokoyama et al. |
| 2004/0001719 | A1 | * | 1/2004 | Sasaki .......................... 398/115 |
| 2013/0163997 | A1 | | 6/2013 | Sheu |

OTHER PUBLICATIONS

Ismail, Omar S., Official Action dated Feb. 7, 2014, in Yi-Zhong Sheu, U.S. Appl. No. 13/598,635, filed Aug. 30, 2012, 15 pages, United States Patent and Trademark Office, Arlington, VA.

* cited by examiner

*Primary Examiner* — Akm Enayet Ullah
(74) *Attorney, Agent, or Firm* — Novak Druce Connolly Bove + Quigg LLP

(57) ABSTRACT

An optical transmission system includes an optical emitting source, a plurality of optical fiber connectors, a first optical fiber, a plurality of second optical fibers, a plurality of third optical fibers, and a plurality of optical receiving terminals. The optical emitting source is configured for emitting optical signals. The first optical fiber connects the optical emitting source to one of the optical fiber connectors. Each of the second optical fibers is connected between two adjacent of the optical fiber connectors. Each of the third optical fibers is connected between a respective one of the optical fiber connectors and a respective one of the optical receiving terminals.

2 Claims, 3 Drawing Sheets

# OPTICAL TRANSMISSION SYSTEM CAPABLE OF TRANSMITTING OPTICAL SIGNALS ACCORDING TO ADDRESS INFORMATION

BACKGROUND

1. Technical Field

The present disclosure relates to an optical transmission system.

2. Description of Related Art

An optical transmission system typically includes an optical emitting source, a photoelectric conversion device connected to the optical emitting source, and a number of terminals connected to the photoelectric conversion device. The photoelectric conversion device converts optical signals emitted from the optical emitting source into electrical signals and sends the electrical signals to the corresponding terminal. However, because of the limited capacity of the photoelectric conversion device, only a limited number of terminals can be connected to the photoelectric conversion device.

Therefore, an optical transmission system which can overcome the above-mentioned problems is needed.

BRIEF DESCRIPTION OF THE DRAWINGS

FIG. 2 is a schematic view of one of the control modules of FIG. 1, wherein the control module is in a state of letting the optical signals passing through.

DETAILED DESCRIPTION

Figure 1:
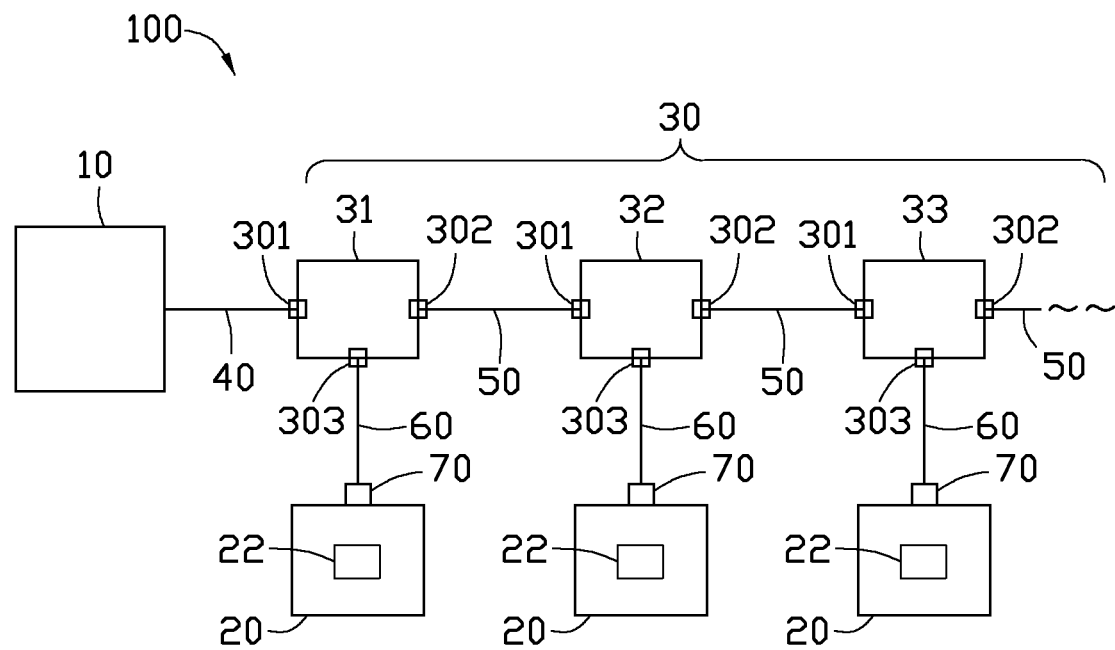
FIG. 1 is a schematic view of an optical transmission system according to an exemplary embodiment, the optical transmission system including a number of control modules.

FIG. 1 shows an optical transmission system 100 according to an exemplary embodiment. The optical transmission system 100 includes an optical emitting source 10, a number of optical receiving terminals 20, a number of optical fiber connectors 30, a first optical fiber 40, a number of second optical fibers 50, and a number of third optical fibers 60. In the embodiment, the optical fiber connectors 30 include a first optical fiber connector 31, a second optical fiber connector 32, and a third optical fiber connector 33.

The first optical fiber connector 31 is connected to the optical emitting source 10 via the first optical fiber 40. Each two adjacent optical fiber connectors 30 are connected via one of the second optical fibers 50. Each optical fiber connector 30 is connected to one corresponding optical receiving terminal 20 via one of the third optical fibers 60.

In the embodiment, each of the optical fiber connectors 30 includes a first socket 301, a second socket 302, and a third socket 303. The first socket 301 of the first optical fiber connector 31 is connected to the optical emitting source 10 via the first optical fiber 40. The second socket 302 of the first optical fiber connector 31 is connected to the first socket 301 of the second optical fiber connector 32. The second socket 302 of the second optical fiber connector 32 is connected to the first socket 301 of the third optical fiber connector 33. The third socket 303 of each optical fiber connector 30 is connected to the corresponding optical receiving terminal 20 via the third optical fiber 60. Each optical receiving terminal 20 includes a photoelectric conversion unit 22. The photoelectric conversion unit 22 is used to convert optical signals transmitted by the third optical fiber 60 to electrical signals.

Figure 2:
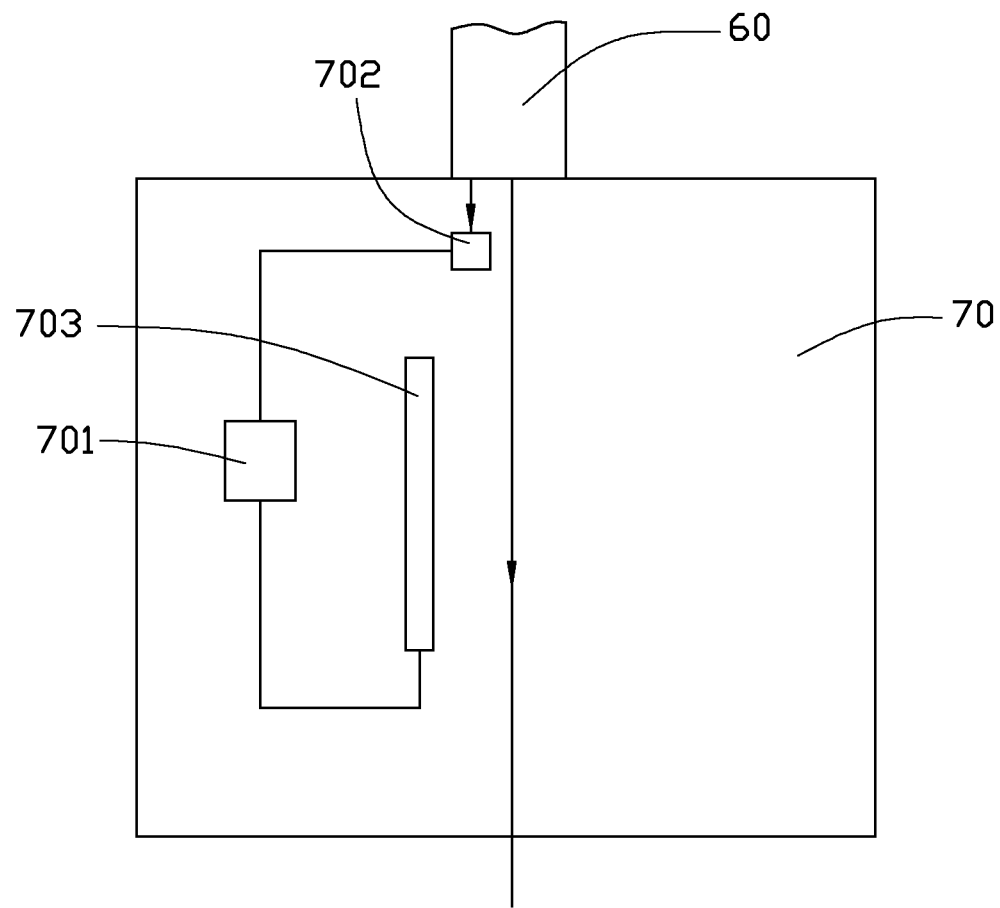
Figure 3:
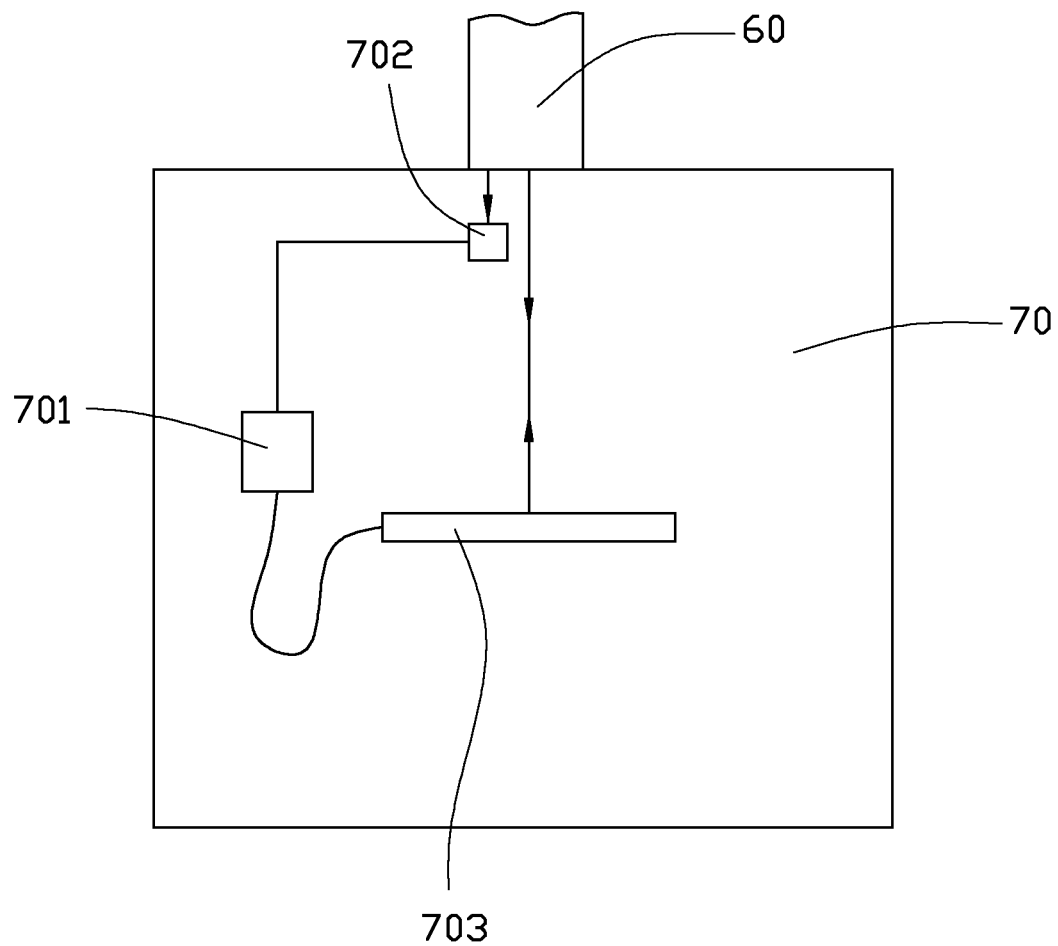
FIG. 3 is similar to FIG. 2, except that the control module is in a state of reflecting back the optical signals.

The optical transmission system 100 further includes a number of control modules 70. Each optical receiving terminal 20 is connected to the third optical fiber 60 via one of the control modules 70. Referring to FIGS. 2 and 3, each control module 70 includes a controller 701, a signal analyzer 702, and a reflector 703. The signal analyzer 702 and the reflector 703 are connected to the controller 701. The signal analyzer 702 stores a receiving address.

When working, optical signals emitted by the optical emitting source 10 are transmitted by the first optical fiber 40, the optical fiber connectors 30, the second optical fibers 50, and the third optical fibers 60 are received by the control modules 70. The optical signals include address information. The signal analyzer 702 compares the address information with the receiving address stored in the signal analyzer 702. When the address information is consistent with the receiving address, the optical signals pass through the control module 70 and reach the optical receiving terminal 20, and the photoelectric conversion unit 22 converts the optical signals into electrical signals. When the address information is inconsistent with the receiving address, the signal analyzer 702 sends a starting signal to the controller 701, the controller 701 drives the reflector 703 to rotate, the reflector 703 reflects the optical signals back to the third optical fiber 60 and generates a standing wave in the third optical fiber 60. In this way, the energy of the optical signals does not loss before reaching a matching control module 70.

The optical fiber connectors 30 are connected in series and the optical receiving terminals 20 are connected to the optical fiber connectors 30 respectively. In this way, an infinite number of optical receiving terminals 20 can be added into the optical transmission system 100.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An optical transmission system, comprising:
an optical emitting source configured for emitting optical signals;
a plurality of optical fiber connectors;
a first optical fiber connects the optical emitting source to one of the optical fiber connectors;
a plurality of second optical fibers, each of the second optical fibers connected between two adjacent of the optical fiber connectors;
a plurality of optical receiving terminals;
a plurality of third optical fibers, each of the third optical fibers connected between a respective one of the optical fiber connectors and a respective one of the optical receiving terminals; and
a plurality of control modules, each of the control modules connected between a respective one of the optical receiving terminals and a respective one of the third optical fibers, each of the control modules comprising a controller, a signal analyzer, and a reflector, the signal analyzer and the reflector being connected to the controller, the signal analyzer storing a receiving address, the optical signals emitted by the optical emitting source comprising an address information, the signal analyzer comparing the receiving address with the address information, wherein when the address information is consistent with the receiving address, the optical signals pass through the control module, when the address information is in consistent with the receiving address, the analyzer sends a starting signal to the controller, the controller controls the reflector to rotate according to the starting signal, and the reflector reflects the optical signals back to the corresponding one of the third optical fibers.

2. The optical transmission system of claim 1, wherein each of the optical receiving modules comprises a photoelectric conversion unit, and the photoelectric conversion unit is configured for converting the optical signals into electrical signals.

\* \* \* \* \*